A. WHITLOW.
HEAD LAMP CONTROLLING MEANS.
APPLICATION FILED MAR. 20, 1915. RENEWED APR. 26, 1917.

1,236,242.

Patented Aug. 7, 1917.
2 SHEETS—SHEET 1.

Witnesses

Inventor
A. Whitlow,
By Victor J. Evans
Attorney

A. WHITLOW.
HEAD LAMP CONTROLLING MEANS.
APPLICATION FILED MAR. 20, 1915. RENEWED APR. 26, 1917.
1,236,242.
Patented Aug. 7, 1917.
2 SHEETS—SHEET 2.
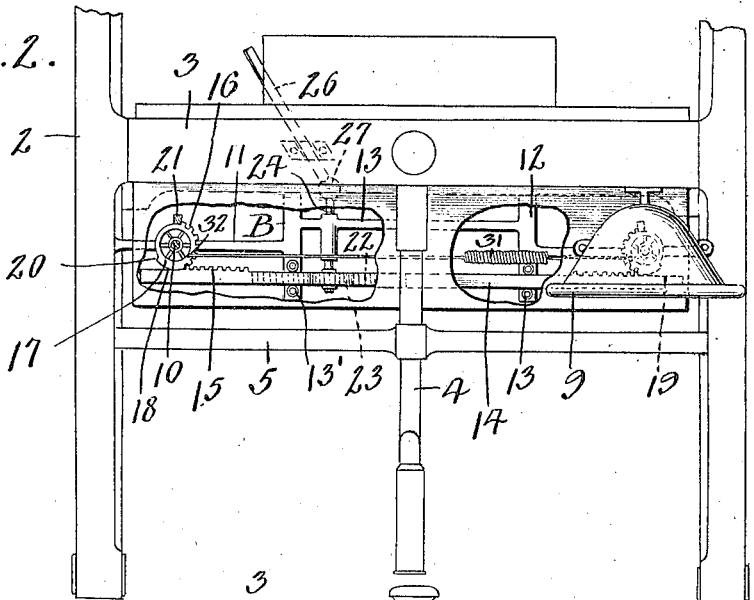
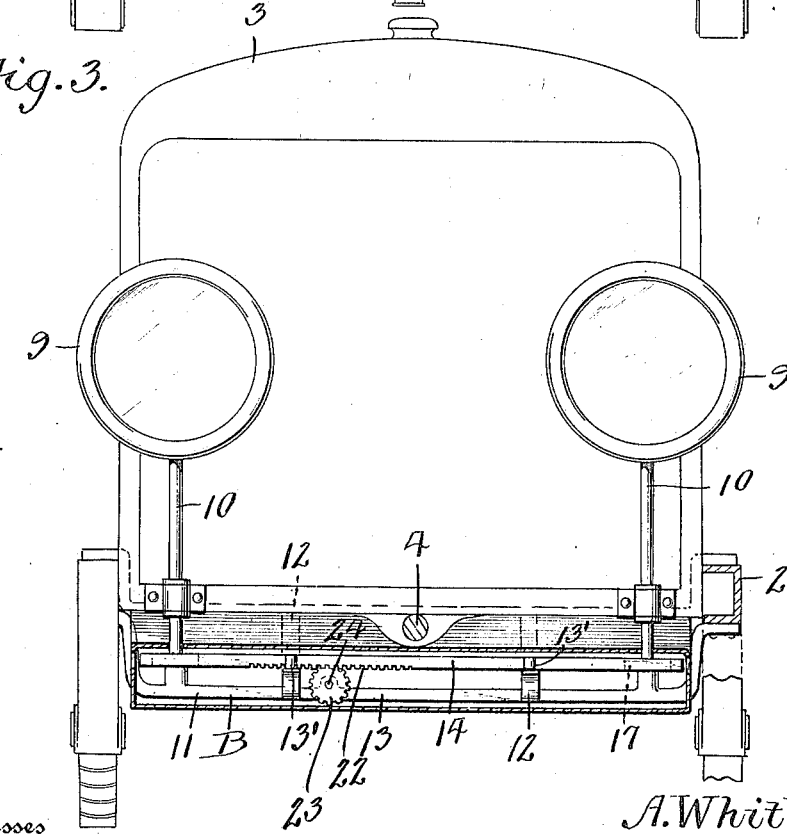

UNITED STATES PATENT OFFICE.

ALAMANDER WHITLOW, OF PORT ARTHUR, TEXAS.

HEAD-LAMP-CONTROLLING MEANS.

1,236,242.  Specification of Letters Patent.  Patented Aug. 7, 1917.

Application filed March 20, 1915, Serial No. 15,885. Renewed April 26, 1917. Serial No. 164,788.

*To all whom it may concern:*

Be it known that I, ALAMANDER WHITLOW, a citizen of the United States, residing at Port Arthur, in the county of Jefferson and State of Texas, have invented new and useful Improvements in Head-Lamp-Controlling Means, of which the following is a specification.

This invention relates to headlamp controlling means for motor vehicles, the object of the invention being to provide simple and effective mechanism whereby the operator while in his seat in the machine may turn either one of the headlamps on a substantially vertical axis and independently of the other headlamp, through an arc of ninety degrees, more or less, thereby enabling the operator to illuminate a considerable portion of the road way on either side of the machine, greatly assisting the operator in finding his way after nightfall.

A further object of the invention is to provide simple means for operating said lamps independently of each other and returning each lamp to its straight ahead position upon the release of the manually controlling device by the operator.

With the above and other objects in view, the invention consists in the novel construction, combination and arrangement of parts, as herein described, illustrated and claimed.

In the accompanying drawings:—

Fig. 2 is a similar view showing the casing only partly broken away.

Fig. 3 is a front elevation with the casing partly broken away in section, showing the lamp controlling mechanism of this invention.

Figure 1:
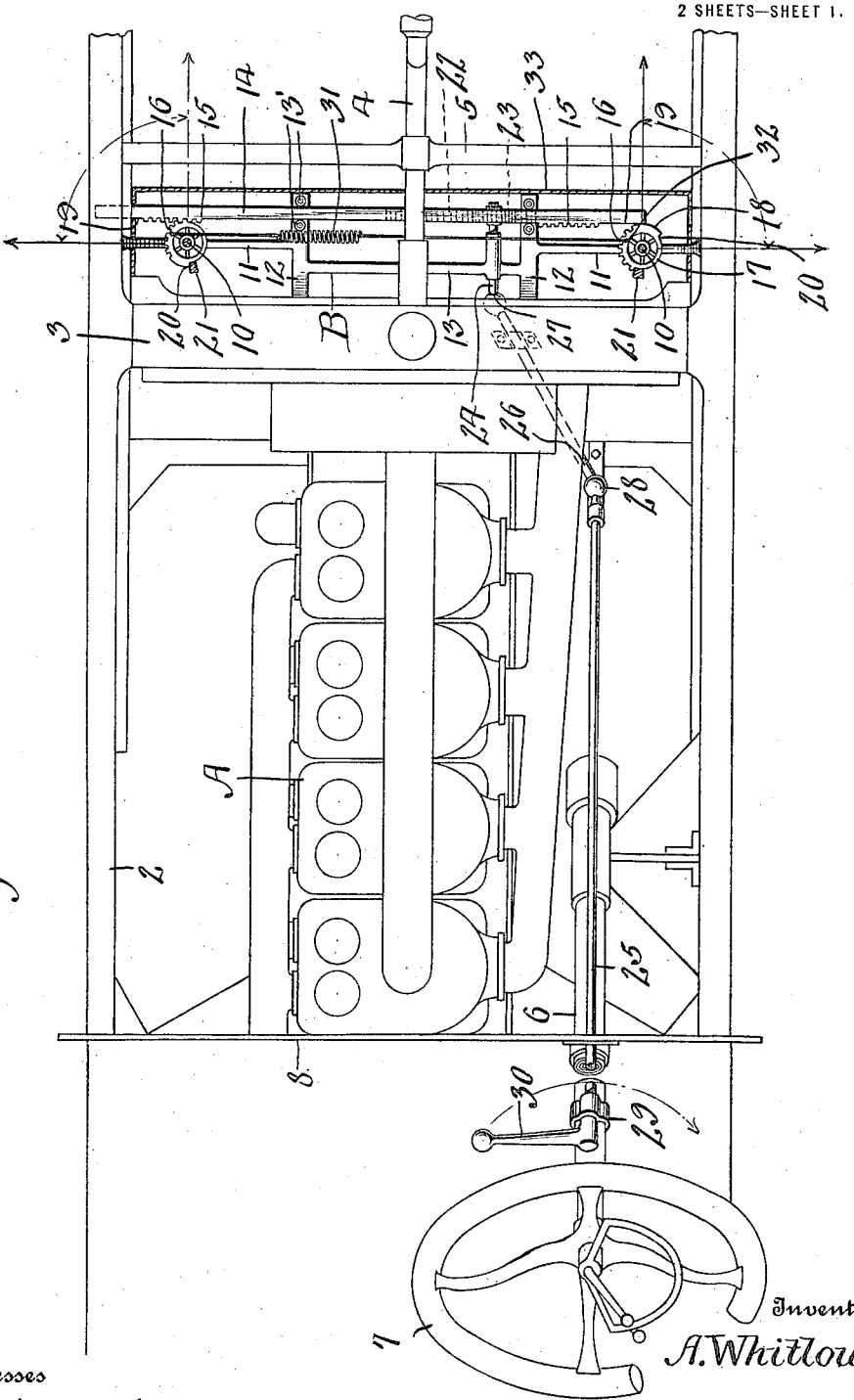
Figure 1 is a plan view of a sufficient portion of an automobile to illustrate the application of the present invention thereto, the greater portion of the casing of the lamp controlling mechanism being broken away to better illustrate the mechanical parts of the mechanism.

Referring to the drawings A generally designates the engine of an automobile, or motor truck, 2 the frame or chassis thereof, 3 the radiator, 4 the starting crank, 5 the crank support, 6 the steering column, 7 the hand controlling wheel of the steering mechanism, and 8 the dash, all of said parts being of the usual construction and relative arrangement.

In carrying out the present invention, each of the headlamps 9 is carried by a substantially vertical lamp post 10, said post being illustrated as journaled in bearings carried by a bracket designated generally at B and comprising the end portions 11 which are connected to the side bars of the frame or chassis, the offset and transversely extending portions 12 which are connected to the sub-frame, and the central connecting portion 13 which is terminally associated with the transverse portions 12.

Each of the transverse portions 12 of the bracket carries a pair of anti-friction guide rollers 13 arranged in spaced relation to each other as shown so as to guide and direct the movements of a longitudinally shiftable bar 13 extending transversely of the frame of the vehicle. Adjacent to each end the bar 14 is provided with a series of rack teeth 15 adapted to engage the teeth 16 of a mutilated lamp turning gear 17 fast on the adjacent lamp post 10.

In addition to the teeth 16, each gear 17 is provided with a smooth arcuate face 18 which is adapted to ride against a corresponding straight and untoothed face 19 at the adjacent end of the bar 14 so that when said bar is shifted in one direction, the face 19 will slide against the face 18 of the gear 17 without any tendency to turn said gear. When, however, the bar 14 is shifted in the opposite direction, the teeth 15 engage the teeth 16 and turn the gear 17 through an arc of ninety degrees or, in other words, from a position in which the lamp directs its rays straight forwardly to a position at right angles to the longitudinal axis of the vehicle as indicated by the arrows in Fig. 1. The smooth arcuate face 18 terminates in a stop shoulder 20 which coöperates with a fixed stop 21 on the bracket above referred to thereby limiting the turning movement of the lamp, the terminal tooth of the gear 17 also coöperating with the stop 21 to hold the lamp in a forwardly facing direction so as to illuminate the road way in front of the vehicle.

In addition to the teeth 15, the bar 14 is provided with a rack face or teeth 22 engaged by a rotary pinion 23 fast on the forward end section 24 of a tumbling shaft the rear and longer section of which is indicated at 25. The shaft also comprises an intermediate oblique section 26 which is coupled to the sections 24 and 25 by the universal joints 27 and 28 respectively. The several sections of the tumbling shaft are mounted to turn in bearings 29 arranged at suitable places, one of said bearings being arranged in proximity to the controlling wheel 7. The section 25 of the tumbling shaft extends longitudinally of the steering column 6 and adjacent to the bearing 29 said shaft is provided with an operating member or lever arm 30 making it convenient for the operator to manipulate the lamp turning mechanism without moving his position.

31 designates a contractile lamp centering spring the terminals 32 of which are connected to the gears 17 so that when either one of the lamps is turned to one side, the spring 31 is stretched and when the lamp turning mechanism is released, said spring operates to return the lamp to its forwardly facing position. Said spring 31 also serves to hold the opposite gear 17 in contact with the stop 21 thereby maintaining the lamp associated with the last named gear in a forwardly facing position.

From the foregoing description, taken in connection with the accompanying drawings, it will now be understood that when the operator moves the member 30 to one side or the other, a corresponding movement is imparted through the rack and pinion mechanism to one of the lamps but not the other. Therefore, while the machine is in actual operation, one lamp remains facing in a forward direction so as to illuminate the road over which the vehicle is traveling while the other lamp is swung to any desired angle thereby enabling the occupants of the vehicle to observe houses and other objects along the side of the road way as they are passing such objects. The arrangement will also be found advantageous in other respects and for other purposes which will readily suggest themselves to the owner or driver of the machine equipped with the head lamp controlling mechanism of this invention.

What I claim is:—

1. The combination with the frame of a motor vehicle, of a pair of headlamps, substantially vertical posts carrying said lamps and journaled to turn in bearings provided therefor, and means for turning either one of said lamps independently of the other, said means embodying a longitudinally shiftable bar movable in a plane parallel to a straight line intersecting both lamp posts, a lamp turning gear fast on each of said posts, two sets of rack teeth adjacent to each end of said bar so designed that only one set at a time may coöperate with the respective lamp turning gear, and manually operable means for shifting said bar in either direction.

2. The combination with the frame of a motor vehicle, of a pair of headlamps, substantially vertical posts carrying said lamps and journaled to turn in bearings provided therefor, and means for turning either one of said lamps independently of the other, said means embodying a longitudinally shiftable bar movable in a plane parallel to a straight line intersecting both lamp posts, a lamp turning gear fast on each of said posts, two sets of rack teeth adjacent to each end of said bar so designed that only one set at a time may coöperate with the respective lamp turning gear, and manually operable rack and pinion mechanism for shifting said bar in either direction.

3. The combination with the frame of a motor vehicle, of a pair of headlamps, substantially vertical posts carrying said lamps and journaled to turn in bearings provided therefor, and means for turning either one of said lamps independently of the other, said means embodying a longitudinally shiftable bar movable in a plane parallel to a straight line intersecting both lamp posts, a lamp turning gear fast on each of said posts, two sets of rack teeth adjacent to each end of said bar so designed that only one set at a time may coöperate with the respective lamp turning gear, manually operable rack and pinion mechanism for shifting said bar in either direction including a tumbling shaft extending lengthwise of the steering column, and a shaft-operating member in proximity to the controlling wheel of the steering mechanism.

4. The combination with the frame of a motor vehicle, of a pair of headlamps, substantially vertical posts carrying said lamps and journaled to turn in bearings provided therefor, and means for turning either one of said lamps independently of the other, said means embodying a longitudinally shiftable bar movable in a plane parallel to a straight line intersecting both lamp posts, a lamp turning gear fast on each of said posts, two sets of rack teeth adjacent to each end of said bar so designed that only one set at a time may coöperate with the respective lamp turning gear, manually operable means for shifting said bar in either direction, and a lamp centering spring common to both lamps and adapted to be stretched by the turning of either lamp.

5. The combination with the frame of a motor vehicle, of a pair of headlamps, substantially vertical posts carrying said lamps and journaled to turn in bearings provided therefor, and means for turning either one of said lamps independently of the other, said means embodying a longitudinally shiftable bar movable in a plane parallel to a straight line intersecting both lamp posts, a lamp turning gear fast on each of said posts and provided with a stop shoulder, a fixed shoulder with which said stop shoulder engages to limit the turning movement of the respective lamp, two sets of rack teeth adjacent to each end of said bar so designed that only one set at a time may coöperate with the respective lamp turning gear, and manually operable means for shifting said bar in either direction.

In testimony whereof I affix my signature in presence of two witnesses.

ALAMANDER WHITLOW.

Witnesses:
  NENA JOCK,
  P. L. MAJOR.

Copies of this patent may be obtained for five cents each, by addressing the "Commissioner of Patents, Washington, D. C."